March 15, 1966 J. V. FITZGERALD 3,239,981

CERAMIC PRODUCTS

Filed Dec. 12, 1961 5 Sheets-Sheet 1

INVENTOR.
JOHN V. FITZGERALD
BY
Morgan, Finnegan, Durham & Pine
ATTORNEYS

INVENTOR.
JOHN V. FITZGERALD
BY
Morgan, Finnegan, Durham & Pine
ATTORNEYS

INVENTOR.
JOHN V. FITZGERALD

INVENTOR.
JOHN V. FITZGERALD

March 15, 1966 J. V. FITZGERALD 3,239,981

CERAMIC PRODUCTS

Filed Dec. 12, 1961 5 Sheets-Sheet 5

INVENTOR.
JOHN V. FITZGERALD

United States Patent Office 3,239,981

Patented Mar. 15, 1966

3,239,981

CERAMIC PRODUCTS

John V. Fitzgerald, Metuchen, N.J., assignor to Tile Council of America, Inc., New York, N.Y., a corporation of New York Filed Dec. 12, 1961, Ser. No. 158,809
10 Claims. (Cl. 52—309)

This application is a continuation-in-part of my copending application Serial No. 471,748, filed November 29, 1954, and now abandoned.

The present invention relates to multi-tile panels, and structural members suitable for use as surface coverings, space dividers, counter-tops, fenestrations, and the like.

It is difficult and expensive to fabricate large pieces of ceramic tile by conventional methods of manufacture, such as by extrusion or by pressing and then firing in kilns. In order to satisfactorily manufacture large pieces of vitreous tile in accordance with the teachings of the prior art it is necessary that the pieces be made extremely thick so that they will be sufficiently strong for handling and shipping. Such large pieces of tile, however, because of the thickness required, are extremely heavy, and are generally fragile and brittle, and require special anchoring techniques during installation.

Because of the foregoing difficulties, ceramic tile is ordinarily manufactured in relatively small sizes. Thus, the size of ceramic pieces rarely exceeds about 54 square inches (9″ x 6″) and is usually equal to or less than about 17 square inches for glazed wall tile. Ceramic mosaics are usually 1″ x 1″. The thickness of the tile is almost always less than about ¾″ and when the tile is glazed, rarely exceeds ⅜″, and is usually approximately ¼″ for ceramic mosaic type tile.

Because of the small size in which ceramic tile has to be manufactured, one of the most significant costs connected with use thereof is that of installation.

The tile manufacturers in the United States have steadily improved methods of tile preassembly during the decades of the twentieth century. At first tile were individual units which the tile setter handled as such during installation of a wall or floor of ceramic tile. One of the first steps in the direction of preassembly was to mount ceramic mosaic tile on paper attached to their face side with water soluble glue. Later the methods of mounting tile on perforated paper or vinyl sheet permanently bonded to the tile back was employed, and a variation of this method, the use of fibre mesh permanently bonded to the tile backs, followed.

In no case mentioned above did the preassembly save the setter more than the time of individual handling. Setting procedures were the same as before, but faster, and grouting procedures were completely unchanged.

Heretofore, multi-ceramic tile panels have been constructed with various backing materials employed as a support for the panel. For example, glazed wall tile have been glued to gypsum board, plywood, or other backing material and the joint between the tile filled with a Portland cement grout. Panels constructed in accordance with such procedures are not very suitable for installation, in that they are heavy, fragile, and are difficult to cut or trim to size. Moreover, because of the backing, the grout tends to crack and come out from between the edges of the tiles.

Some recent advances in the field of preassembly of individual tiles have attempted to overcome the disadvantages of the backing materials described in the preceding paragraph. In one commercial embodiment, described in U.S. Patent No. 2,852,932, a plurality of tile are mounted in a rubber grid-work having depressions or pockets designed to receive the tile. Another commercial embodiment involves the mounting of tile on a rubber sheet and the hand grouting of such tile with an epoxy grout.

The preassemblies described do not in general permit flexibility in design. Moreover, such preassemblies have non-ceramic material on one of the faces of the preassembled sheet which seriously limits the kind of setting adhesive or mortar which can be used, in particular eliminating the use of Portland cement mortar in the pregrouted types of panels described above. The first of the described panels requires a soft, flexible grout material between tile because tile must be inserted into the preformed grid, and the bond is between tile and grid, rather than between tile and tile. The soft grout is detrimental to the tile in use. Heavy service cracks and chips the tile because of lack of support from the low strength flexible grout and the soft pad beneath and surrounding the tile. The other method involving hand grouting is not in any way suited to production line manufacture, and the relatively soft cushion under the tile results in cracked tile when the least abuse of the surface occurs.

The panels of the present invention consist of a plurality of ceramic tile bonded solely together at their edges by an interlocking lattice of bonding or grouting cement. The surfaces of the panel are free of grouting or backing material, so that the panels are extremely light. Such panels can be readily packaged and shipped, and can be adhered to practically any surface as a pregrouted unit, thereby leading to a tremendous savings in installation costs. Such panels can also be used for fenestration, where the tile are translucent or transparent, or where the tile are provided with apertures, and for decorative space dividers, counter-tops, wall and floor coverings and the like.

The panels of the present invention may serve as a substitute for and are generally superior in wear resistance to conventional inlaid linoleum.

The primary object of this invention is to provide improved prefabricated, pregrouted multi-tile panels.

Another object of this invention is to provide prefabricated, pregrouted panels of the type described which are easy to cut or trim to proper size.

Still another object of this invention is to provide prefabricated, pregrouted panels of the type described which may be quickly and easily installed on all kinds of surfaces and which may serve as a substitute for conventional floor covering, such as linoleum.

Another object is to provide prefabricated, pregrouted panels of the type described which are pregrounted, with no non-ceramic material on either face of the panel.

Another object is to provide prefabricated, pregrouted tile panels of the type described which have an exposed grout joint along their periphery and which may be perfactly sized to match with other panels of the same kind to form a complete surface.

Another object of the invention is to provide prefabricated, pregrouted tile panels of the type described which can be set with all types of adhesives presently used with ceramic tile, including Portland cement mortars.

Another object of the invention is to provide prefabricated, pregrouted ceramic tile panels of the type described with one side true and level in spite of the natural variation in thickness from tile to tile.

Another object is to provide prefabricated, pregrouted tile panels of the type described which are flexible and which can be readily set on curved surfaces.

Another object is to provide prefabricated, pregrouted tile panels of the type described which are extremely light in weight.

Still another object of the invention is to provide prefabricated panels of the type described having a plurality of irregularly shaped tile pieces or bits, the tile pieces and/or bits being regularly or irregularly shaped, and the tile pieces or bits being joined solely at their edges, with no non-ceramic material on either face of the panel.

A further object of the present invention is to provide prefabricated, pregrouted panels containing a plurality of regularly or irregularly shaped pieces or bits of tile regularly or irregularly spaced in the panel, the tile pieces or bits being joined solely at their edges, by an interlocking lattice of adhesive material, with no adhesive material on either face of the panel, the tile pieces or bits being unsupported except for the interlocking lattice of adhesive material.

Still another object of this invention is to provide prefabricated, pregrouted tile panels of the type described which have extremely wear resistant surfaces.

Other and incidental objects of the invention will become apparent after a reading of the following specification and an inspection of the accompanying drawings wherein.

The panels of the present invention are ordinarily assemblies of thin ceramic tiles or tile pieces having a thickness of less than about ⅜″, and generally less than about ¼″, bonded together in edge to edge relationship and solely at their edges, by an interlocking lattice of grout.

The ceramic tile pieces used to make the panels may have a density of between about 1.50 and 2.90 grams/cubic centimeter, and usually have a density of between about 2.30 and 2.50 grams/cubic centimeter. The tile may contain absorbed water ranging from about 0 to 25 percent by weight of the tile.

The panels themselves, depending upon the tile employed, have a weight per square foot of surface area, based upon tile, of between about 1.50 and 4.0 pounds per square foot, and usually about 1.90 and 3.0 pounds per square foot.

The amount of grout in the panels will ordinarily vary between about 1 and 40 percent by weight, usually between about 3 and 25 percent by weight, based upon the weight of the tile. As will be appreciated, the panels of the present invention are extremely light, and compare favorably in weight with such materials as asphalt tile.

The grouting material in the panels is susceptible of wide variation, and depends upon the rigidity or flexibility desired in the panels. Depending upon the grouting material, the panels may be perfectly rigid, or may be extremely flexible. The flexible panels are suitable for covering curved surfaces, or for wrapping around columns and the like.

As indicated in co-pending application, Serial No. 471,748, epoxy resin is particularly suitable for use.

In one form of the invention the epoxy type of resin consists of 100 grams epoxide resin, Epon 828, Shell Chemical Company, a liquid, epoxide type resin, having an equivalent weight equal to 80 grams, and an epoxide equivalent weight equal to approximately 200; 8 grams diethylene, Catalyst D, Shell Chemical Company, an amine-type catalyst, believed to be diethylene triamine; 8 grams titanium dioxide, Unitane, American Cyanamid Company, a rutile-form titanium dioxide pigment.

Figures 1, 2, 3:
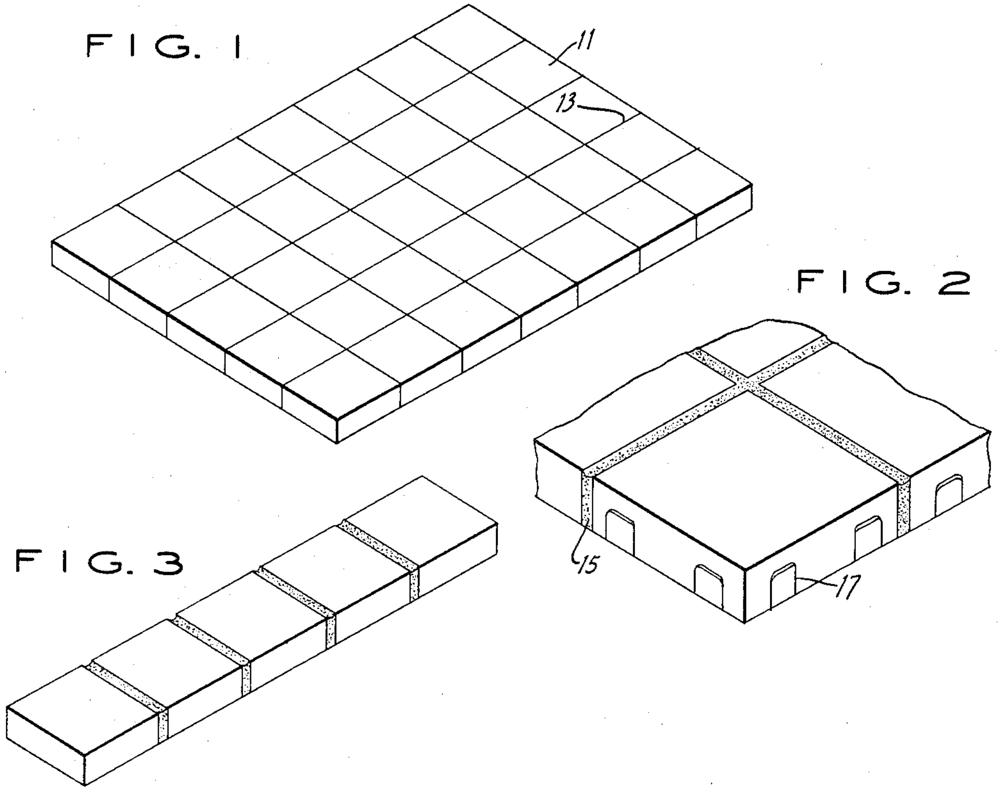
FIGURE 1 illustrates one form of a multi-ceramic tile panel of the present invention.
FIGURE 2 illustrates a section of the multi-ceramic tile panel of FIGURE 1.
FIGURE 3 shows another form of the panel of the present invention.

Turning now in more detail to FIGURE 1 there is shown a multi-ceramic tile panel consisting of a plurality of ceramic tiles 11 bonded together edge to edge at 13 by means of an epoxy type resin. Although the panel illustrated in FIGURE 1 consists of thirty-five individual ceramic tiles, having a dimension of five tiles in one direction and seven tiles in another direction it is intended that the panel may be made in any dimensions and may also consist of a row on either one side or another side of panel of fractions of tile in order to permit the panel to be of certain outside dimensions.

The tiles of FIGURE 1 may be of the same color or the panel may consist of tiles of various colors to form a panel having a certain predetermined pattern or border. It is preferred, however, that the glazed side of the ceramic tile all be located on the same surface of the panel.

Turning now to FIGURE 2 there is shown more detail concerning the tile panel. In FIGURE 2 it will be seen that the epoxy type resin 15 which is employed to bond together the various ceramic tiles is concave at its upper surface corresponding to the glazed surface of the tile. The slight concave surface in the epoxy resin 15 provides a pleasing appearance of the tile panel.

The form of tile shown in FIGURE 2 employs spacers 17.

The spacing between the tiles shown in FIGURES 1 and 2 may be of the order of $\frac{1}{32}$ inch. The size of the tile illustrated is approximately $\frac{5}{16}$ inch thick and measures 4¼ inch by 4¼ inch.

Turning now in more detail to FIGURE 3, there is shown another form of panel made in accordance with the teachings of this invention. In the form shown in FIGURE 3 the panel consists of a single row of ceramic tile bonded edge to edge with an epoxy type resin. This form of panel may be employed, for example, to advantage as a border or trim.

Figure 4:
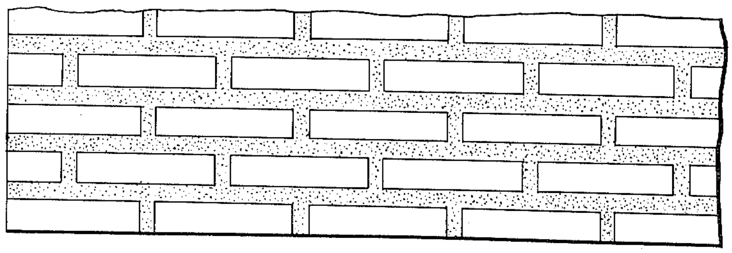
FIGURE 4 illustrates still another form of the panel of the present invention.

In FIGURE 4 there is shown still another form of this invention involving ceramic tile bonded together edge to edge but wherein the joints along certain edges of the ceramic tile are staggered so that only two edges of the tile are in line with the corresponding two edges of the next adjacent ceramic tile. The size and shape of the ceramic tile illustrated in FIGURE 4 are also different from the size and shape of the ceramic tile illustrated in the panels of the previous figures of the drawing.

Figures 5, 6:
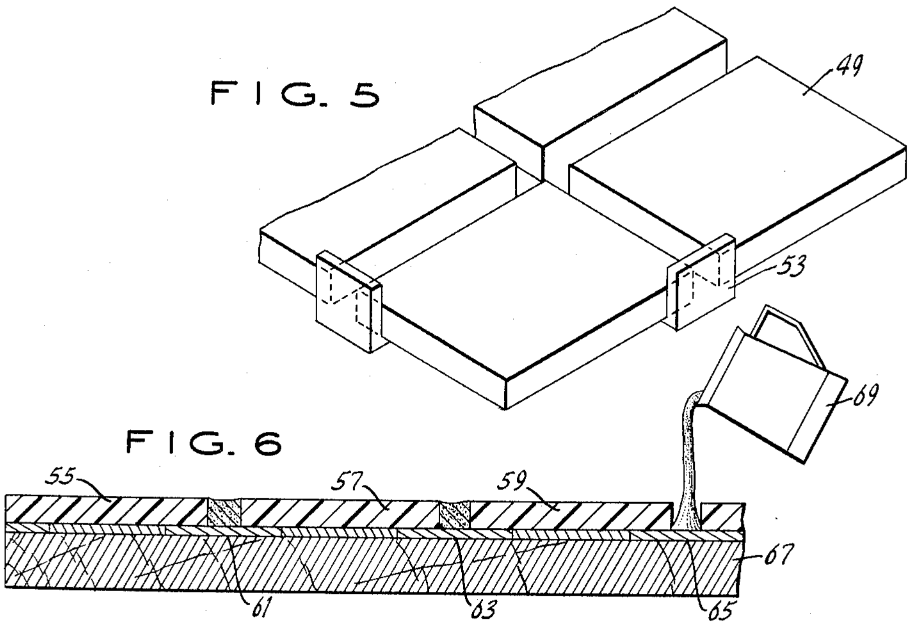
FIGURES 5 and 6 illustrate one method of constructing the panels disclosed herein.

In FIGURE 5 there is shown an arrangement whereby the epoxy type resin in liquid form may be poured into the spaces between the ceramic tiles in order to bond the tiles together edge to edge to form a panel of the desired size. The tiles 45, 47, and 49 are spaced by an amount sufficient to permit filling of the space between the tiles with the epoxy resin. Gate members 51 and 53 which may be made of pressure sensitive paper tape, are positioned at the edges of the tiles 45, 47 and 49 in order to prevent the liquid epoxy type resin from flowing out from between the tiles. It is important to note here that the glazed side of the tiles 45, 47 and 49 is positioned downward so that the bonding agent may be poured into the grooves between the tiles 45, 47 and 49 from the unglazed side of the tile as shown in more detail in FIGURE 6.

In FIGURE 6 there is shown a plurality of tiles 55, 57 and 59 with their glazed surface on the lower side. In FIGURE 6 an important aspect of this invention is illustrated. Adhesive tape 61, 63 and 65 is first laid on the table top or other surface 67 with the adhesive side upward. The tiles 55, 57 and 59 are then positioned on the adhesive tape and securely fastened thereto. The adhesive tape not only holds the tile in position while the bonding is being poured, but the adhesive tapes 61, 63 and 65 prevent the bonding agent from flowing under the tile and on the glazed surface of the tile.

A simple method of pouring the epoxy type resin between the tiles 55, 57 and 59 is suggested in FIGURE 6 wherein there is shown a container containing a supply of liquid bonding agent, such as an epoxy resin, which is poured into the cracks between the tiles 55, 57 and 59.

Although in FIGURE 6 the tapes 61, 63 and 65 are ilustrated as being laid parallel, it will be remembered that tapes may also be laid crosswise of the tapes 61, 63 and 65 to cover the joints between the tiles 55, 57 and 59 in other rows. For example, in FIGURE 5, a tape would be positioned along the bottom of the groove between the tiles 47 and 49. Likewise a tape would be positioned along the bottom of the groove between the tiles 45 and 47.

In order to provide for a neat and smooth surface of the grout at the joints between four tiles where the tapes cross each other it is desirable to feather the edges of the tape at their crossing so that the thickness of the tape at the crossing of the tape will not cause an abrupt step in the grout the depth of the thickness of the tape. The irregularity may be prevented if the edge of the upper tape is feathered for the width of the groove between the tile. Tape having a feathered edge may be employed for this purpose.

Figure 7:
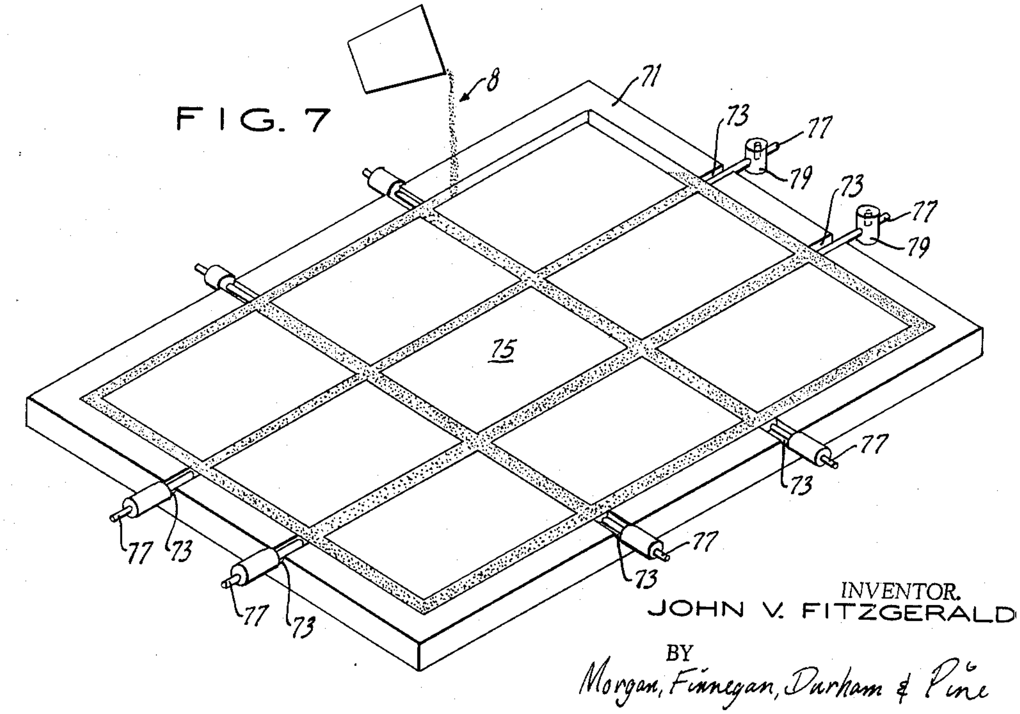
FIGURE 7 illustrates still another method of the type described herein.

Turning to FIGURE 7 there is shown still another form of this invention which involves a frame 71 having a plurality of grooves 73 on its upper surface at a location corresponding to the space between the tiles 75.

Before the tiles 75 are placed in the frame 71 a series of rods 77 are inserted in the grooves 73 forming a network of rods which form spaces corresponding to the size of the tile 75. The tiles may then be quickly and easily inserted into the frame 71. Knobs 79 each containing a set screw may be employed to tighten the rods 77 into position. The rods 77 may be removed from the frame 71 after the tiles 75 have accurately positioned.

By employing the apparatus shown in FIGURE 7 the construction of a tile panel may be as follows: The rods 77 are placed in position and tightened with the knobs 79. The frame, the rods, and the knobs are then inverted and placed on a flat surface such as a table top or rigid sheet. The tile 75 are then placed into position glazed side up. The adhesive tape is then stretched over the surface of the tile to cover all the grooves between the tile 75. The whole assembly is then inverted so that the bottom or unglazed side of the tile is positioned upward. The epoxy type resin or other bonding agent is then poured into the grooves between the tiles and the assembly is then allowed to stay in that position without being disturbed until the bonding agent has set. In the operation just described the rods 77 are removed after the grout has been poured. After the bonding agent has set (oven heat or infra-red lamps may be used to accelerate set), the panel may be removed from the frame 71.

In accordance with the teachings of this invention ceramic tile panels consisting of ceramic tile bonded together edge to edge by means of an epoxy type resin have been constructed by first placing as many as thirty-five ceramic tiles glazed side up on a surface such as plywood. Each of the ceramic tiles were separated approximately one/sixteenth of an inch from each of the adjacent ceramic tiles. All of the joints between the tiles were then covered with one inch wide masking tape. The tape was then firmly pressed against the tile edges.

Another slab such as plywood was then placed over the assembly and held in position with clamps. The whole assembly was turned over and the clamps removed in order that the uppermost slab of plywood could be removed. The ends of the masking tape were then pressed vertically against the edges of the outside ceramic tiles so as to form dams at the ends of the grooves between the tiles.

Seventy-three grams of Exide K3B resin, an epoxide-type synthetic compound in liquid form (Bisonite Company, 128 Lakeview Avenue, Buffalo, New York) were mixed with six grams of Unitane titanium dioxide whiting, a rutile-form titanium dioxide pigment, (American Cyanamid Company, 30 Rockefeller Plaza, New York, New York) and six grams of Exide K3B catalyst, an amine-type catalyst. This mixture was poured into the grooves between the tiles. The working time of this mixture was forty to forty-five minutes. After eighteen hours the thirty-five ceramic tiles had become bonded together into a single strong panel ¼ inch by 29⅛ inches by 21½ inches. Moreover, the entire panel had some flexibility because of the use of the epoxy type resin as a bonding agent. When the masking tape was peeled off, the panel had the appearance of a freshly tiled wall. The panel was easily cut by scribing the glazed surface with a steel wheel and applying a tension to the panel across the scribe.

Panels made in accordance with the teachings of this invention may be employed as the walls of a prefabricated shower stall. Panels may be fixed with rubber type adhesive to an aluminum angle frame measuring, for example, 1 inch by 1 inch by ⅛ inch. Ceramic tile panels may also be used to form a bathroom wall. The panels may be glued to the buliding studding with a rubber type waterproof adhesive.

Epoxy resins uniquely meet the requirement for bonding tiles edge to edge into large panels. Epoxy type resins show little or no volume charge on setting up. They bond exceedingly well to ceramic tile edges and are very strong. Under test, a panel constructed in accordance with the teaching of this invention may break in the tile and not in the joint or at the interface between the epoxy and the tile body. Epoxys are resistant to moderate range of temperature change. Epoxys resist acids and alkalies and can be compounded with other resins to increase their flexibility. The catalyst can be varied to give lower or higher viscosity as desired. The epoxy resins can be suitably colored by additives of pigment or organic dyes or used in transparent form with lighting from behind for special artistic effects.

Although certain of the epoxy resins otherwise suitable have a high coefficient of thermal expansion, the high coefficient of thermal expansion may be reduced by merely adding silica as a filler.

The resins can be reinforced with fiberglass or asbestos fiber, if desired.

The form of the invention shown in FIGURE 3 wherein tile are bonded in long strips is analogous to wood lumber or exterior siding. The bonded ceramic strips can easily be cut to proper length and installed on walls with waterproof rubber adhesive or metal clips to provide a very attractive wall.

Satisfactory strips were made from Epiphen resins and catalysts, also epoxide type, liquid resins and organic amine-type catalysts, of the Borden Co., New York City, as well as other epoxy resins such as Epon 828 resins of the Shell Chemical Co., 500 Fifth Avenue, New York city, Bakelite C8 resins, also epoxide type, liquid resins of variable viscosity, containing one gram-mole of epoxy group per 170 to 200 grams of resin, of the Bakelite Co., 30 East 42nd St., New York 17, New York, and Araldite epoxy resins, liquid epoxide type of resins, of variable viscosity, of the Ciba Co., Inc., 627 Greenwich St., New York 14, New York.

A preferred method of producing the panels of the present invention is shown in FIGURES 8 to 15, inclusive, and is disclosed in co-pending application, Serial No. 158,707 filed December 12, 1961.

Figure 9:
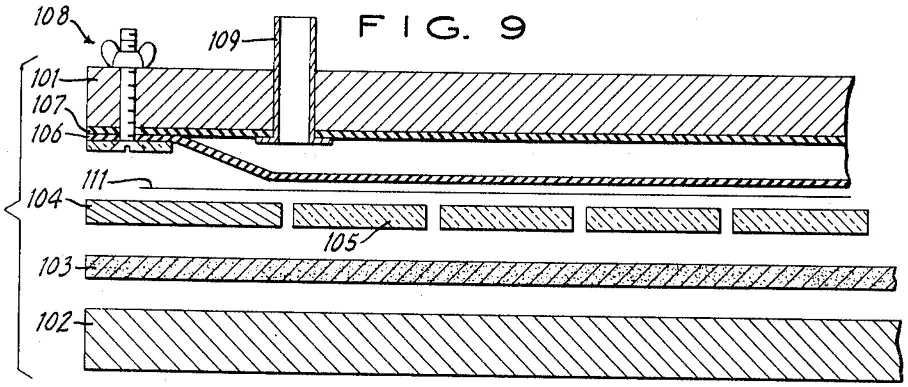
FIGURE 9 is a longitudinal cross section of a portion of the mold shown in FIGURE 1.
Figure 10:
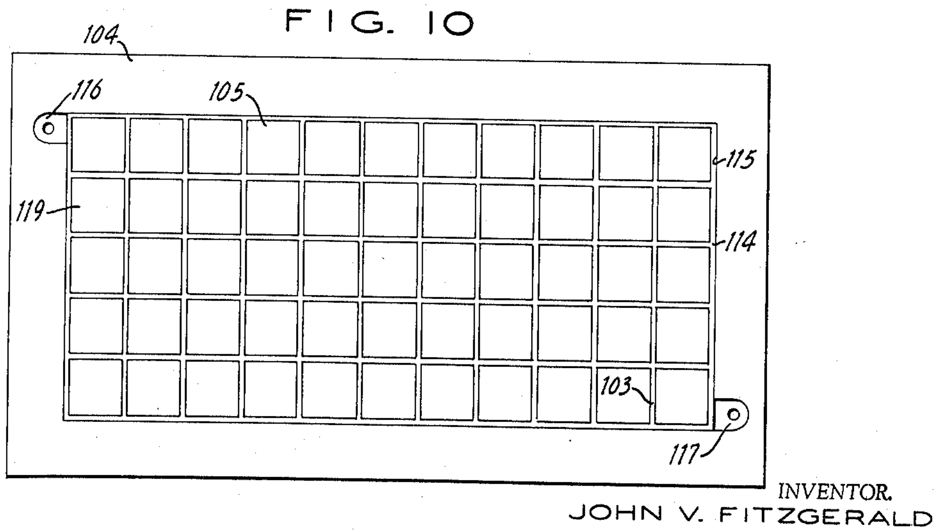
FIGURE 10 is a plan view showing several parts of the mold of FIGURE 1.
Figure 11:
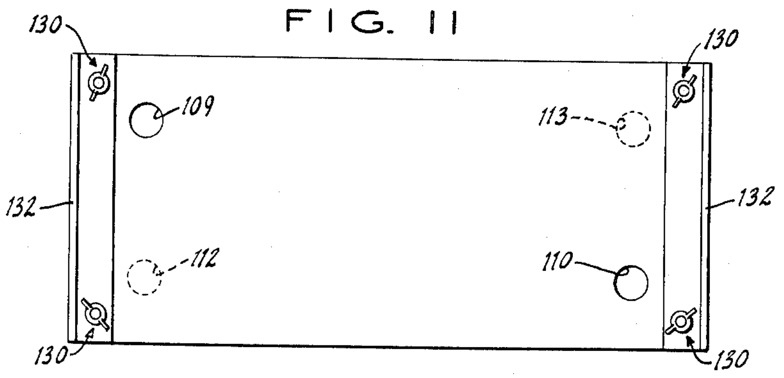
FIGURE 11 is a plan view of the mold showing the position of various inlets and outlets, and the clamping means.
Figure 12:
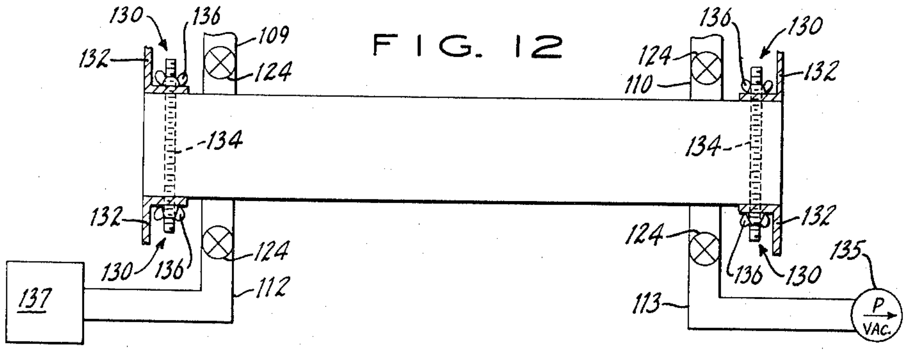
FIGURE 12 is a longitudinal view of the mold.

The mold design, as shown in FIGURES 8 to 12, consists of a structural place 102 which is essentially a flat plate of suitable thickness, modified only with holes for grout injection nozzle 112, and grout outlet nozzle 113 (FIGURES 11 and 12). The plate 102 may be metal, such as steel, or any other suitable rigid material.

The plate 102 is completely covered with pad 103 which is a relatively soft, elastomeric material, such as rubber, and has a smooth plane surface in contact with the tile 105.

The surface of pad 103 must be of a nature that it will not bond to the injection liquid when it hardens so that easy and complete release from the hardened injection liquid is possible. Pad 103 had two holes through it which match the two holes in plate 102 for nozzles 112 and 113. A frame 104 is supported by pad 103 and surrounds the plurality of tile 105. The frame 104 is constructed of a rigid dimensionally stable material such as steel and is completely coated with a material which will not bond to the hardened injection liquid so that easy and complete release of one from the other is possible. For a steel frame 104 Teflon coating has been recognized as ideal for most injection materials. The frame 104 defines an opening 117 (FIGURE 10) in which the tile 105, previously mounted on a sheet of masking type paper 111 (FIGURE 9) preferably not creped and of a low tack, or otherwise suitable oriented on pad 103, are placed. When the tile are paper backed, the free surface is supported on pad 103, and the paper backing 111 overlaps frame 104 as shown in FIGURE 9. The positioning of the tile plurality within the frame is important for correct and complete filling of all joints surrounding and between the individual tile, as will be explained later.

Figure 8:
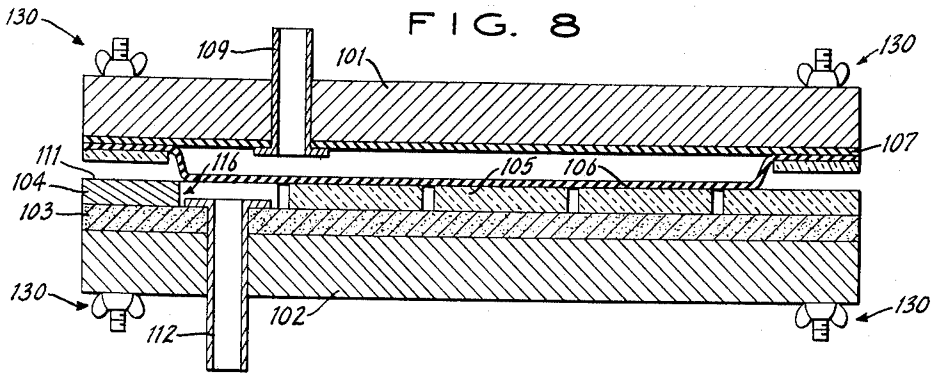
FIGURE 8 is a lateral cross section of a mold preferred for use in preparing the panels of the present invention.

The structural plate 101 with diaphragms 106 and 107 is placed in contact with the masking paper 111 (FIGURE 10) or with the tile themselves (FIGURE 8). Plate 101 is of a character similar to plate 102.

During the molding operation, water or other liquid or gas, is circulated through the space between diaphragms 106 and 107, entering and leaving the space through nozzles 109 and 110 (FIGURES 11 and 12). Baffles may be required in the space between diaphragms 106 and 107 to insure equal flow throughout in those cases when the pressurizing fluid is used as a heating or cooling medium.

The liquid or gas circulated through the space between diaphragms 106 and 107 under pressure is primarily used to supply uniform pressure against the tiles to hold and seal the tile plurality. Because of their hydraulic nature, the diaphragms 106 and 107 form a variable pressure means which supplies a uniform, readily controllable pressure against the tile more evenly and with more controls than is possible with any mechanical pressure means.

Hold down flange 108 is used to hold and seal the edges of diaphragms 106 and 107, but other means to accomplish this union of diaphragms 106 and 107 may be employed. Also, when plate 101 is impermeable, diaphragm 107 may be omitted, as will be brought out hereinbelow. The thickness and the rigidity of diaphragm 106 is chosen to provide control of the surface of the tile plurality 105 keeping it plane and level, tile to tile, by forcing any difference in tile thickness to be absorbed by pad 103 which has been described as relatively soft and flexible.

If desired, diaphragms 106 and 107 take the form of a hollow tube.

Diaphragm 106 is preferably sufficiently rigid to prevent penetration of portions of the surface thereon into the space between the tiles when pressure is applied.

If, however, it is desired to have the grouting material assume a concave shape between the tile, the diaphragm 106 exerting pressure on the tiles may be thin enough, or be made of a suitable material, such that it will bulge slightly into the spaces between the tile upon application of pressure. Preferably, however, the diaphragm 106 is sufficiently thick and of a suitable material to prevent bulging.

The structural frame for the whole assembly may comprise suitable clamps, shown generally at 130 in FIGURES 11 and 12. In their simplest form, the clamps may consist of pieces of angle irons 132 held together by rods 134 and bolts 136.

The clamping means must be strong enough to hold the assembly intact against the force resulting from the pressure of the liquid or gas in the hollow space between diaphragms 106 and 107, or between an impermeable structural plate 101 and diaphragm 106.

The arrangement of the grout injection nozzles 112 and vent 113 is important and affects the ease and degree of perfect filling of joints between the tiles, and if desired, surrounding the tile and between the frame and tile.

In the embodiment shown in FIGURES 8 to 12, the injection nozzle 112 and vent nozzle 113 are located at opposite corners of the rectangularly shaped mold shown therein (FIGURE 11). The location of the injection and vent nozzles at opposite corners of a rectangular shaped mold has been formed to give particularly good results.

FIGURE 10 shows a plan view of the frame 104 with the tile spaced therein and resting on pad 103, which can be seen in the spaces between the tile 105 and in the channel 114 between the tile and the inner periphery 115 of frame 104. In FIGURE 10, the top portion of the apparatus including structural member 101 and diaphragms 106 and 107 have been removed.

Openings 116 and 117 (FIGURE 10) are provided in the frame 104 and communicate with the peripheral space 114 between the tile and inner sides 115 of frame 104, and with the injection nozzle 112 and outlet nozzle 113, respectively. The grout injection nozzle 112 and the grout outlet nozzle 113 communicate with the openings 116 and 117. The connection between the grout injection nozzle 113 and opening 116 in frame 104 is shown in FIGURE 1. A similar connection is used for outlet nozzle 113.

As can be seen in FIGURE 10, there is an interconnecting open passageway leading from opening 116 to the channel 114 between the tiles and the frame 104, and to the spaces between the tiles 105.

The openings 116 and 117 in FIGURE 10 are shown as circular coves, and these coincide with the location of nozzles 112 and 113 through plate 102 and 103.

Figure 16:
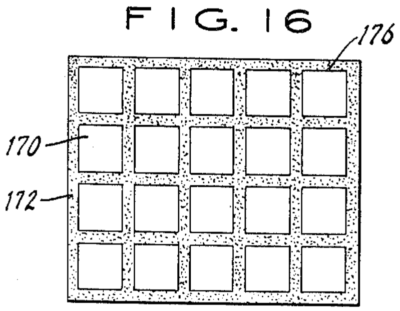
FIGURES 16 to 21 are schematic illustrations of the preferred prefabricated, pregrouted panels of the present invention.

The channel 114 surrounding the tile is provided only if it is desired that the panel have an exposed grout joint surrounding the panel as shown at 176 in FIGURE 16. If no exposed grout joint is desired, the tile may be placed in the mold with their sides flush with the inner periphery 115 of rigid frame 104.

Suitable valves 124 (FIGURE 12) for pressure regulation are provided on nozzles 109, 110, 112 and 113.

In operation of the device of FIGURES 8 to 12, the tiles 105, are suitable spaced edge to edge on pad 103 and the mold assembled. A suitable fluid, liquid or gas, at a suitable temperature, is fed to conduit 109 to maintain a suitable pressure on diaphragms 107. The diaphragm 107 presses against the top of the tiles with a uniform pressure on the surfaces of all of the tiles and forces the tile into sealing contact with diaphragm 106 and pad 103.

As already indicated, the pressure on diaphragm 106 exerts control of the surface of the tile plurality against which it presses, keeping it plane and level, tile to tile, by forcing any difference in tile thickness to be absorbed by pad 103, which has already been described as being resilient. The surface of the panel contacted by diaphragm 106 accordingly is completely planar. The advantages of having panels at least one surface of which is true will immediately be obvious to those skilled in the art.

If the pad 103 is completely rigid, so that the tile pieces cannot penetrate, the difference in thickness will be taken up by the diaphragm 106. In this embodiment, it will be the surface of the tile against member 103 that will be planar.

Best results are however achieved by making pad 103 soft and resilient, so that this pad will compensate for the difference in thickness of the panels.

Following pressurizing of the diaphragm 106, the grouting material in suitable form is fed to the injection nozzle under suitable pressure. The grouting material flows from a source 137 (FIGURE 12) through the injection nozzle 112, into the opening 116 in frame 104, and thence through the passageways between the tiles and between the tiles and frame 104, and completely fills these interconnecting passageways. Excess grouting material may be exhausted through vent conduit 113. If desired, a vacuum may be drawn on vent conduit 113, by means of a suitable vacuum producing means, such as a vacuum pump 135 shown in FIGURE 12 to facilitate flow of the grouting material through the interconnected passageways.

In a preferred method of operation, prior to commencing injection, the valve 124 on injection nozzle 112 is closed, and vacuum drawn on nozzle 113. This produces a vacuum in the passageways between the tiles and between the tiles and the inner periphery of frame 104, thereby facilitaing flow of the grouting cement. Evacuation of the passageways prior to injection of the fluid grouting material also minimizes bubbles in the grout joint resulting from entrapped air.

When evacuation of the passageways precedes injection, it is not necessary to provide an outlet 13. Best results are however achieved when a grout outlet connected to a suitable vacuum source is employed, so that the passageways are constantly under vacuum during filling of the passageways.

Figure 13:
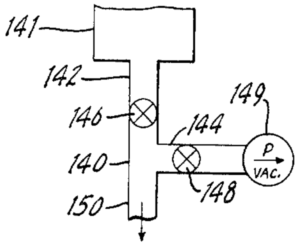
FIGURE 13 is a schematic illustration of a modified form of a fluid grout injection means for the mold of FIGURE 8.
Figure 14:
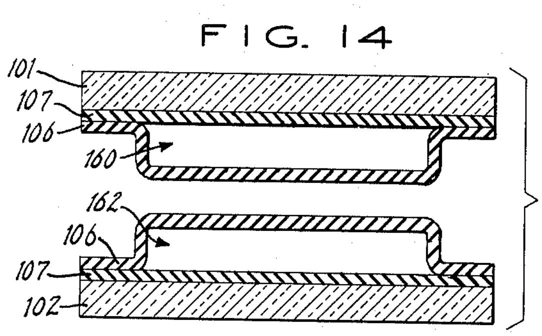
FIGURE 14 is a cross section of modified pieces of the mold of FIGURE 1.

In FIGURE 13 there is shown a modification of injection inlet 112 which may be used with the described vacuum technique. The injection conduit 140 is in the shape of a T, with the legs 142 and 144 provided with valves 146 and 148. The lower leg 150 of the T leads to the mold. In operation, with valve 146 closed, and valve 148 open, a vacuum is drawn on the mold by vacuum means 149 through leg 144. Following evacuation, valve 148 is closed, and valve 146 opened. Leg 142 leads to a source of the fluid grout 141, and when valve 146 is opened, the fluid grout flows down leg 150 and into the evacuated passageways between the tile and between the tile and the inner periphery of frame 104.

Injection pressure may vary from a few ounces to many pounds, depending upon the viscosity of the injection liquid. When the passageways are evacuated prior to injection, and the grouting material is of a low viscosity, gravity flow of the injection material has been found to be sufficient. When gravity flow is employed, it is desirable to invert the mold following assembly from the position shown in FIGURES 8 to 12, so that the plate 2 is at the top.

The pressure developed between diaphragms 106 and 107 will depend primarily upon the type of material of which diaphragm 106 is made, and its wall thickness. It is of course necessary that the pressure be sufficient to prevent escape of the grouting material between the diaphragm 106 and pad 103 and the tiles. Pressure as low as between about 8 and 15 p.s.i.g. between diaphragms 106 and 107 have been found perfectly suitable.

The temperature of the pressurizing fluid between diaphragms 106 and 107 will depend upon the type of grouting material employed. With some grouting materials, cooling rather than heating will facilitate hardening, and if this is the situation, a cooling fluid, under pressure, will be circulated between the diaphragms.

In any event, it will be clear that the flexible variable pressure means formed by diaphragms 106 and 107 and exerting pressure against the tile surfaces will serve as a heat exchanger as well as a variable, controllable pressure means.

Following injection of the grouting material, a suitable time is allowed for setting, and then the mold is broken down and the prefabricated tile panel removed therefrom.

In the embodiment shown in FIGURES 8 to 12, it is possible to substitute for the pad 103 a variable pressure means. Such an embodiment is shown schematically in FIGURE 14. In this embodiment, pressurizing fluid may be fed to the chambers 160 and 162, formed between diaphragms 106 and 107, the diaphragms being fixed to structural elements 101 and 102, respectively, so that variable, controllable pressure can be exerted upon both surfaces of the tile.

Figure 15:
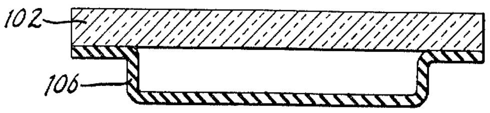
FIGURE 15 is a cross section of still another modified piece of the mold of FIGURE 1.

Also, as has already been indicated, it is not necessary, when the structural members to which the diaphragm 106 is attached is impermeable, to employ two separate diaphragms to form the variable pressure chamber. Thus, where the structural member 101 is impermeable, it is only necessary to employ diaphragm 106. This embodiment is shown in FIGURE 15.

It is also not necessary that the tiles be preassembled on masking paper. Thus, the tiles may be oriented on the supporting pad by mechanical means, or manually.

It will be appreciated that the mold of FIGURES 8 to 15 may be used to assemble a single panel, or a plurality of panel concurrently.

It should also be understood that although the process described herein is a batch operation, continuous process techniques can be used employing the principles described.

When two or more panels are made concurrently, a common injection nozzle, or separate injection nozzles for each panel may be employed.

It should also be understood that the temperature of the pressurizing liquid or gas fed to the space between the diaphragms 106 and 107 may be varied during the process, so as to cure with heat, and then cool the product before removing it from the mold. In other words, all combinations of temperature to meet the need of the injection liquid used are possible.

Tile panels made using the procedure and mold just described are depicted schematically in FIGURES 16 to 21.

In FIGURE 16, which is a plan view, the panel contains a plurality of rectangularly shaped tiles 170 uniformly arranged. The interlocking lattice of grout 172 bonds the tile together. The grout, it will be noted, is in the form of an interconnecting lattice structure. An exposed grout joint also completely circumscribes the plurality of tiles, as is shown at 176. This exposed grout joint or border of grout permits grinding of the panel to uniform, accurate dimensions, thus permitting sizing so that the panel can be matched with other panels of the same kind to form a complete surface.

Figure 17:
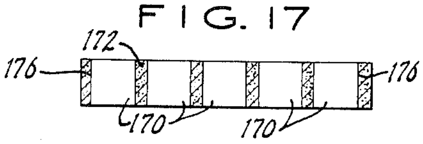

FIGURE 17 is a cross sectional view of the panel shown in FIGURE 16. As shown in FIGURE 10, the tiles 170 extend from the top of the panel to the bottom so that both surfaces are exposed to give wear resistant surfaces. The interconnecting grout lattice 172 also extends from the top to the bottom surface of the panel, and is level with the bottom and top surfaces of the tile. Thus, both surfaces of the panel are essentially flat.

Figure 18:
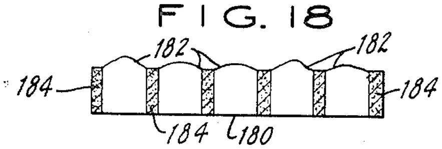
Figure 19:
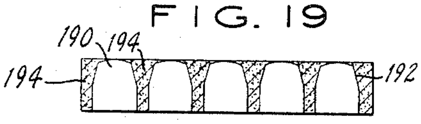

FIGURE 18 is a cross section of another panel of the present invention. In this embodiment, the lower surface 180 of the panel is flat, but the upper surface 182 is irregular, portions of the tile pieces 181 extending above the interlocking grout lattice 184. The tile pieces used to prepare this panel, in other words, were not of a uniform thickness. As has already been indicated, the method and apparatus described in FIGURES 8 to 11 and discussed herein compensate for this difference in thickness of the tiles.

Figure 20:
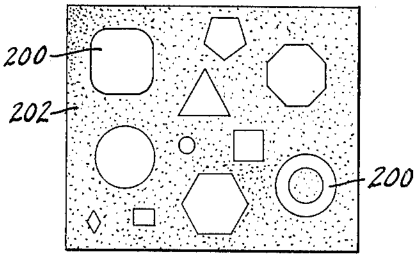

FIGURE 20 is a cross section of still another form of tile panel of the present invention. The tile 190 in this panel are formed with bevelled or curved edges 192, known in the trade as "cushion" edges.

As will be seen from FIGURE 12, the interlocking grout lattice 194 completely fills the spaces between the tiles, including the space between the cushion edges, to form a flat surface.

In FIGURE 20, there is shown a panel in which the pieces of tile 200 are irregularly shaped and irregularly spaced. The tile pieces are however arranged edge to edge, and the interlocking lattice of grouting material 202 fills all the spaces between the tile and thereby joins the tile pieces together solely at their edges.

Figure 21:
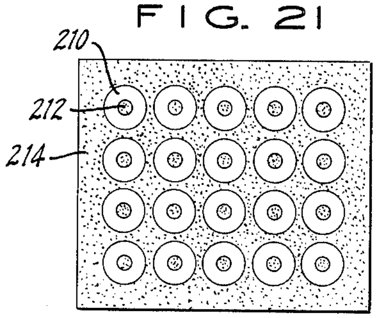

In FIGURE 21, there is shown a panel in which the pieces of tile 210 contain perforations or openings 212. The do-nut shaped tiles are bonded together edge to edge, with the interlocking grout lattice 214. Note in this embodiment, that the openings 112 of the tiles are open passageways extending from the top to the bottom of the panel.

The form of panel shown in FIGURE 12 is suitable for fenestration or as a space divider, especially when the tile pieces 210 are glazed on both sides.

The tiles used to make the panels described may be unglazed, glazed on one surface only, or glazed on two surfaces.

As has already been pointed out, any suitable type of cementing material may be used for the grout. In addition to epoxy resin adhesives, already mentioned, may also be named hydraulic cement, polyester resins, vinyl resins, such as polyvinyl chloride and polyvinylidene chloride, rubber, both natural and artificial, polyurethane resins, and the like.

When organic adhesives of the type described are used, suitable curing agents, accelerators, extenders, plasticizers, and so forth, which are conventional, may be employed.

If desired, the grouting material may contain pigments and coloring agents to produce grouting of a specified color and shade. Aggregates, such as silica, silica gel, sand, and so forth may also be used to improve bond strength in a manner now well understood in the art.

In the event that an anti-static installation is desired, small amounts of a conductor may be added to the grout formulation. Thus, for example, carbon black and small amounts of metal, such as copper and the like, may be added to the grouting material. Alternatively, when anti-static panels are desired, the panels may be fabricated using so-called conductive tile. Such tile is ordinarily made from clays containing a small portion of conducting materials, such as iron or iron ores.

Suitable grout formulations to be used in making panels of the type described are given in the following examples.

*Example 1*

| Moderately flexible grout formula: | Parts by weight |
|---|---|
| Epoxy resin (Araldite DP 437—Ciba Corp.) | 60 |
| Epoxy resin (Araldite 6010—Ciba Corp.) | 40 |
| Catalyst: | |
| EM 308 (Thiokol) | 48 |
| EH 330 (Thiokol) | 3 |
| Pigment: | |
| Titanium dioxide | 2.5 |
| Black iron oxide | 0.10 |

The epoxy resin Araldite DP 437 used in this formulation is a special liquid epichlorohydrin-bisphenol of acetone type having a viscosity at 25° C. of 3500 cps., a specific gravity of 1.13, and an epoxy value of about 0.26 epoxy

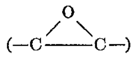

equivalents per 100 grams of resin.

The epoxy resin Araldite 6010 is a conventional liquid bisphenol of acetone type epoxide resin having a viscosity of about 14,000 cps. at 25° C., a specific gravity of 1.16 and an epoxy value of about 0.51 equivalents per 100 grams.

The curing agent EM 308 is believed to be a polyamidoamine compound produced by reacting a polycarboxylic acid with a polyamine. The curing agent EH-330, is believed to be diethylene triamine.

*Example 2*

| Flexible grout formula: | Parts by weight |
|---|---|
| Epoxy resin (Araldite DP-437—Ciba Corp.) | 66 |
| Epoxy resin (Araldite 6010—Ciba Corp.) | 33 |
| Catalyst: | |
| EM 308 Thiokol | 48 |
| EH 330 Thiokol | 3 |
| Titanium dioxide | 2.5 |
| Black iron oxide | 0.1 |

The resins and hardeners in this formula are the same as those described in Example 1.

*Example 3*

| Translucent grout formula: | Parts by weight |
|---|---|
| Epoxy resin (Araldite DP 437—Ciba Corp.) | 60 |
| Epoxy resin (Araldite 6010—Ciba Corp.) | 40 |
| Catalyst: | |
| EM 308 Thiokol | 48 |
| EH 330 Thiokol | 3 |
| Blue dye | 1 |

The resins and hardeners in this formulation have been described in Example 1.

Examples of panels using grouts of the above formulation are as follows:

*Example 4*

These panels were made of maroon, 1½" x 1½" x 3/16" vitreous, square edge, electrically conductive tile using the mold of FIGURES 8 to 12. The grout formulation was that of Example 1.

For this epoxy formula, grout injection pressure was about 2 to 10 pounds, and water at about 180° C. and 8 p.s.i.g. was fed between diaphragms 6 and 7. This water pressure was sufficient to give a pressure in the tiles of about 2 p.s.i.g. The spaces between the tile was about 1/16", and the spaces were evacuated to about 1 mm. water pressure absolute prior to commencing injection of the grout. Injection of the grout was by gravity flow. Injection time was about one minute, and curing time was about 1½ hours.

*Example 5*

These panels were made of yellow, ¾" x 1½" x 3/16" thick vitreous, square edge, ceramic mosaic tile using the mold of FIGURES 8 to 12 and the conditions of Example 4. The grout formulation was that of Example 1. The tile are arranged in the pattern shown in FIGURES 16 and 17 with the interlocking grout lattice between the tile about 1/16" wide. The formed panels were about 21" x 9" x 3/16", and had an exposed grout border about 1/16" wide surrounding the tile. The panels were semi-flexible and could be used as coverings on straight and curved surfaces as substitutes for lineoleum, for counter-tops, space dividers and the like.

*Example 6*

These panels were made of yellow bright glazed, brown matte glazed, and dark brown crystalline glazed 1" x 1" x 3/16" thick, extruded, semi-vitreous bodied, ceramic tile with varying degrees of cushion edge using the mold of FIGURES 8 to 12 and the conditions of Example 4. The tile were arranged edge to edge to form a pattern in the style of the artist Modrian, having a minimal grout joint width approximately 1/64" wide between the tile. The grout had the formula of Example 1. The formed panels were about 21" x 11" x 3/16" thick with an exposed grout border of about 1/16" width. They were highly decorative and were suitable as space dividers and wall coverings.

*Example 7*

These panels were made of glass mosaic tile about 1" x 1" x 3/16" thick, with broken edges in red, yellow, orange and blue colors following the procedure of Example 4 and using the grout formula of Example 1. The panels had an antique quality resembling a stained glass window.

*Example 8*

These panels were made of 1 1/8" diameter x 1/4" thick annular ring, vitreous ceramic tile, cushion edge one side, square edge the other side, following the procedure of Example 4. The grout formula used was that of Example 3, and the finished panels looked like that in FIGURE 21. The points between the tile varied from 1/16" to 1/4". The panels passed blue filtered light through the adhesive grout and permitted unobstructed vision through the holes in the center of each ceramic tile forming a screen through which light and air will pass.

The resinous expoxides suitable for use in the present invention comprise those compounds having the reactive epoxy resin group

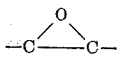

The polyepoxides may be saturated or unsaturated, aliphatic, cycloaliphatic, or heterocyclic and may be substituted if desired with substituents such as chlorine atoms, hydroxyl groups, ether radicals and the like. They may also be monomeric or polymeric.

Examples of the polyepoxides include, amng others, epoxidized glycerol dioleate, 1,4-bis(2,3-epoxypropoxy) benzene, 1,3-bis(2,3-epoxypropoxy) benzene, 4,4'-bis(2,3-epoxypropoxy) diphenyl ether, 1,8 - bis(2,3 - epoxypropoxy)-octane, 1,4-bis(2,3 - epoxypropoxy) - cyclohexane, 4,4' - bis(2-hydroxy - 3,4'-epoxybutoxy-diphenyldimethylmethane, 1,3 - bis(4,5 - epoxypentoxy)-5-chlorobenzene, 1,4-bis(3,4-epoxybutoxy)-2-chlorocyclohexane, 1,3-bis(2-hydroxy-3,4-epoxybutoxy) benzene, 1,4-bis and (2-hydroxy-4, 5-epoxypentoxy) benzene.

Among the preferred epoxides are the epoxy polyethers of polyhydric phenols obtained by reacting a polyhydric phenol with a halogen containing epoxide or dihalohydrin in the presence of an alkaline medium. Polyhydric phenols that can be used for this purpose include, among others, resorcinol, catechol, hydroquinone, methyl resorcinol, or polynuclear phenols, such as 2,2-bis(4-hydroxyphenyl) propane (Bis-phenol A), 2,2-bis (4-hydroxyphenyl) butane, 4,4'-dihydroxybenzophenone, bis(b-hydroxyphenyl) ethane, 2,2-bis(4 - hydroxyphenyl) pentane, and 1,5-dihydroxynaphthalene. The halogen-containing epoxides may be further exemplified by 3-chloro-1, 2-epoxybutane, 3-bromo-1, 2-epoxyhexane, 3-chloro-1, 2-epoxyoctane, and the like.

The monomer products produced by this method from dihydric phenols and epichlorohydrin may be represented by the general formula:

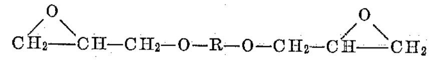

wherein R represents a divalent hydrocarbon radical of the dihydric phenol. The polymeric products will generally not be a single simple molecule but will be a complex mixture of glycidyl polyethers of the general formula:

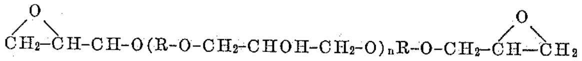

wherein R is a divalent hydrocarbon radical of the dihydric phenol and *n* is an integer of the series 0, 1, 2, 3, and so forth. While for any single molecule of the polyether *n* is an integer, the fact that the obtained polyether is a mixture of compounds causes the determined value for *n* to be an average which is not necessarily zero or a whole number. The polyethers may in some cases contain a very small amount of material with one or both of the terminal glycidyl radicals in hydrated form.

The aforedescribed glycidyl polyethers of the dihydric phenols may be prepared by reacting the required proportions of the dihydric phenol and the epichlorohydrin in an alkaline medium. The desired alkalinity is obtained by adding basic substances, such as sodium or potasisum hydroxide, preferably in stoichiometric excess to the epichlorohydrin. The reaction is preferably accomplished at temperatures within the range of from 50° C. to 150° C. The heating is continued for several hours to effect the reaction and the product is then washed free of salt and base.

These epoxide resins are available in several forms varying from a viscous liquid to a solid resin. Especially suitable are those resins which are liquid or near their softening point at room temperature.

Typical of the epoxy resins which may be employed are the epichlorohydrin-bis-phenol type sold under the trademarks "Epon Resins" (Shell Chemical Corporation), "Gen Epoxy" (General Mills), "DER Resins" (Ciba), "ERL Resins" (Bakelite Corporation), "Epi-Rez" (John Babney); the peracetic acid-epoxidized compounds sold under the trademark "Unox Diepoxides" (Union Carbide Chemical Company); and the trifunctional epoxy compounds sold under the trademark "Epiphen" (The Borden Company). An example of the trifunctional type of compounds is "Epiphen" ER-823, which has the following formula:

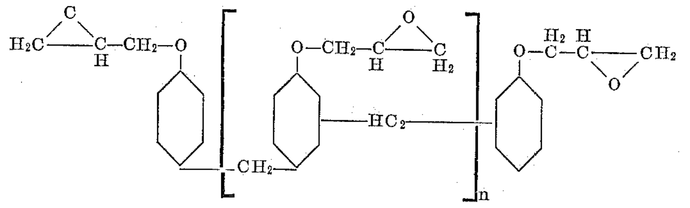

where *n* is a number such that from about 180 to 200 grams of the resin contain about one gram mole of epoxide group.

Typical of the curing or cross-linking agents for epoxy resins may be mentioned the amine curing agents, i.e., amines containing at least 1 and preferably at least 2 amino nitrogen atoms, e.g., polyamines. Such materials include ethylene amine, ethylene diamine, propylene diamine, diethylene triamine, dipropylene triamine, triethylene tetramine, tripropylene tetramine, tetraethylene pentamine, tetrapropylene pentamine, and mixtures of the foregoing. Also may be mentioned higher alkyl polyamines, such as alkyl polyamines in which the alkyl group is butyl, hexyl, octyl, and so forth.

Also suitable for grounting materials are hydraulic cement compositions comprising hydraulic cement, water, an inert aggregate, such as sand and limestone, and small amounts of an organic material, e.g., 0.25 to 10% by weight or more, based on the weight of hydraulic cement to give the cement "dry set" characteristics, and/or to impart flexibility to the bond.

Among such organic materials may be mentioned methyl cellulose, polyvinyl acetate, polyvinyl alcohol, carboxymethyl cellulose, carboxymethyl hydroxyethyl cellulose, and the like, including mixtures of the foregoing.

The polyester resins suitable for use as grouting materials may be defined as polycondensation products of polycarboxylic acids. Particularly suitable are the unsaturated polyester resins produced by reacting a polyhydric alcohol and a polycarboxylic acid, either or both of which contain a double-bonded or otherwise unsaturated pair of carbon atoms. The double bonds in the unsaturated polyester resin thus formed render the polymers capable of subsequent cross-linking. Of the polyhydric alcohols, the glycols of ethylene, propylene, 1,3- and 2,3-butylene, diethylene and dipropylene, each with its own special characteristics, are preferred. The unsaturated polymeric acid may be maleic anhydride, or fumaric acid. Saturated dibasic acid components, such as isophthalic, adipic and azealic acids, and phthalic anhydride, may also be used in forming the polyesters, again with many variations. Linear dibasic acids, for example, adipic acid, may be used to increase flexibility. Also may be mentioned Bisphenol A polyester resins, such as styrene solutions of the reaction product of propylene oxide, bisphenol A and fumaric acid.

If desired monomers containing double-bond unsaturation can be added to the linear unsaturated polyester to achieve a three-dimensional structure when cured. Among such monomers may be mentioned styrene, dialkyl phthalate, vinyl toluene, methyl methacrylate, or trialkyl cyannate.

Cure of the polyester resin is initiated by the addition of a catalyst, usually an organic peroxide or hydroperoxide, such as methyl ethyl ketone peroxide, and the like, and activators or accelerators, such as cobalt naphthenate, alkyl mercaptans, and dialkyl aromatic amines are used to promote the cross-linking reaction so that the cure can be effected at room temperature or short time at higher temperatures.

Among the polyester resins suitable for use may also be mentioned the polyurethane resins, which are prepared by the reaction of unsaturated or unsaturated polyesters of the type described with di-isocyanate compounds, such as 2,4 toluene diisocyanate.

Typical of the polyester resins are the commercial products sold under the tradenames Vibrin 117, Vibrin 121, Vibrin 135 and Vibrin 136A, by United States Rubber, Naugatuck Chemical Division. Such resins are cured by addition of organic peroxide, such as methyl ethyl ketone peroxide. Activators such as cobalt napthenate, alkyl mercaptans, and dialkyl aromatic amines are used to speed up the cross-linking reaction of these resins.

The polyvinyl chloride resins suitable for use as a grouting material in the panels of the present invention are prepared by addition polymerization of vinyl chloride monomer, in the presence of a catalyst, usually an organic peroxide. Also may be mentioned co-polymers of vinyl chloride with vinyl esters, such as vinyl acetate and vinyl maleate, and with vinylidene chloride. Such resins may be modified by the addition of plasticizers, such as di-2-ethyl hexyl phthalate, heat stabilizers, pigments and fillers to obtain a variety of physical characteristics, as is well understood in the art.

Particularly suitable for use are the polyvinyl chloride resins sold under the tradenames Maurinol Vr 50, Pliovic Wo, Pliovic OA, and Pliovic OA–Z, by the United States Rubber Co., Naugatuck Chemical Division. Among suitable plasticizers and extenders may be mentioned Paraplex G–62 sold by Rohm & Haas and Dispersal, sold by Shell Chemical Co.

It should be understood that the grounting materials described herein are merely typical of a wide variety of grouts that may be used, and are not intended to limit the scope of the invention, except as such limitations may appear in the claims.

The products made according to the present invention in which an organic resinous material is employed as the grout represent a new and hitherto unrecognized concept of utilizing two materials, one organic and the other inorganic, as a unique functional and economical composite. The organic grout serves as an edge to edge bonding and joint plugging medium possessing water and reagent resistance as well as plastic and elastomeric properties. Thus, thin, flexible to rigid light in weight sheets and panels may be made. The upper surfaces of the ceramic tiles serve as the wearing surface given hardness, abrasion resistance durability and permanence in color and texture. A principal feature of the products is the fact that the under surface of the tiles are exposed also. Thus when adhered as sheets or panels on floor each tile becomes firmly bonded to the setting mortor, regradless of the nature of the mortar. When rigidly bonded, the composite performs well in service and in the Robinson Floor Tester. Raw material costs for the ceramic tile is about $1.00 per ton or even less. In comparison, the organic resins suitable as grounting materials for the products of the present invention generally cost more than $500 per ton. Consequently, the products made according to the present invention, while very similar in appearance to vinyl and inlaid linoleum flooring are nevertheless superior in functionality, including wear resistance and durability, and are basically cheaper than vinyl and other inlaid linoleum flooring.

As already inferred, the tiles used to make the products disclosed herein may be vitreous, non-vitreous, semi-vitreous, or impervious opaque, transparent or translucent ceramic tile.

Embodiments of the products made by following the teachings herein can be stored in rolls or flat, and may be installed directly like rugs to floor or like wallpaper. In all these embodiments, the load bearing or wearing surface is a hard ceramic.

The invention in its broader aspects is not limited to the specific articles and methods described, but departures may be made therefrom within the scope of the accompanying claims without departing from the principles of the invention and without sacrificing its chief advantages.

What is claimed:

1. A thin, flat, lightweight, unitary continuous sheet of edge to edge bonded ceramic tile pieces which can be stored in rolls and installed like rugs to floors and like wall paper to walls and in which the load bearing surface is a hard ceramic, which consists essentially of a plurality of ceramic pieces spaced edge to edge the ceramic tile pieces having an average thickness of between about 1/4" and 3/8", and having substantially continuous, planar vertical edge walls extending between substantially continuous planar top and bottom horizontal surfaces, an interlocking lattice of a flexible adhesive grout between and separating each of the tile pieces and bonding adjacent ceramic pieces solely at their edges, the interlocking lattice of flexible adhesive grout having an average width of between 1/64" and 1/4", the pieces of ceramic extending through the entire thickness of the continuous sheet so that the top and bottom surfaces thereof are completely exposed, the top and bottom surfaces of the ceramic pieces being free of adhesive grout, and the ceramic pieces being unsupported except for said interlocking lattice of adhesive grout, the weight of tile per square foot of surface area of said continuous sheet being between about 1.50 and 4.0 lbs. per square foot of surface area and the amount of grout being between about 1 and 40%, based upon the weight of the tile, said sheet having substantially parallel horizontal upper and lower surfaces, at least one of said horizontal surfaces being substantially planar and level.

2. A thin, flat, lightweight, unitary detached and separate pregrouted flexible tile panel suitable for packaging and shipping and suitable for use as a prefabricated wall surfacing unit, floor covering, and space divider, said panel consisting essentially of a plurality of ceramic tile pieces spaced edge to edge, the ceramic tile pieces having an average thickness of between about ¼" and ⅜", and having substantially continuous, planar vertical edge walls extending between substantially continuous, planar top and bottom horizontal surfaces, an interlocking lattice of an adhesive grout between each of the tile pieces and bonding adjacent pieces of tile solely at their edges, the interlocking lattice of adhesive grout having an average width of between about 1/64" and ¼", the pieces of tile extending through the entire thickness of the panel, so that the top and the bottom surfaces thereof are completely exposed, the top and bottom surfaces of the tile pieces being free of the adhesive grout, and the tile pieces being unsupported except for said interlocking lattice of adhesive grout, the weight of tile per square foot of surface area of said panel being between about 1.50 and 4.0 pounds per square foot of surface area, and the amount of grout being between about 1 and 40 percent, based upon the weight of the tile, said panel having substantially parallel, horizontal upper and lower surfaces, at least one of said horizontal surfaces being substantially planar and level.

3. The panel of claim 2 wherein ceramic tile pieces are glazed on both sides.

4. The panel of claim 2 wherein ceramic tile pieces contain open apertures which extend through the panel.

5. The panel of claim 2 wherein ceramic tile pieces in the panel are of varying thickness.

6. The panel of claim 2 wherein ceramic tile pieces are irregularly shaped and irregularly spaced throughout the panel.

7. The panel of claim 2 wherein the adhesive grout is an epoxy resin adhesive composition formed by reacting a resinous epoxide having a reaction

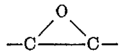

group with a resinous epoxide curing agent capable of entering into a cross-linking reaction with the reactive

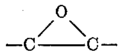

group of the resin.

8. The panel of claim 2 wherein the adhesive grout is a polycondensation product formed by reacting a polyhydric alcohol with a polycarboxylic acid.

9. The panel of claim 2 wherein the adhesive grout comprises hydraulic cement.

10. A thin, planar detached and separate pregrouted flexible tile panel suitable for packaging and shipping and suitable for use as a prefabricated wall surfacing unit, floor covering, and space divider, said panel consisting essentially of a plurality of ceramic tile pieces spaced edge to edge, the ceramic tile pieces having an average thickness of between about ¼" and ⅜", and having substantially continuous, planar vertical edge walls extending between substantially continuous, planar top and bottom horizontal surfaces, and an adhesive grout between each of the tile pieces having a width of between about 1/68" and ¼" and bonding the tile together solely at their edges, the pieces of tile extending through the entire thickness of the panel, so that the top and bottom surfaces thereof are exposed, the top and bottom surfaces of the tile being free of the adhesive grout, the tile pieces being unsupported except for said interlocking lattice of adhesive grout, and an exposed joint of the adhesive grout bonded to the edges of those tile pieces not surrounded by other tile pieces, and serving as a finishing edge for the panel, the weight of tile per square foot of surface area of said panel being between about 1.50 and 4.0 pounds per square foot of surface area, and the amount of grout being between about 1 and 40 percent, based upon the weight of the tile, said panel having substantially parallel, horizontal upper and lower surfaces, at least one of said horizontal surfaces being substantially planar and level.

References Cited by the Examiner

UNITED STATES PATENTS

| | | | |
|---|---|---|---|
| 176,617 | 4/1876 | Garlick | 94—11 |
| 762,428 | 6/1904 | Munro | 52—388 |
| 1,441,197 | 1/1923 | Kent | 156—304 |
| 1,887,777 | 11/1932 | Morris | 52—315 |
| 1,925,460 | 9/1933 | Pegram | 156—297 |
| 2,018,711 | 10/1935 | Elmendorf | 52—403 |
| 2,045,382 | 6/1936 | Elmendorf | 52—586 |
| 2,052,229 | 8/1936 | Hyde | 52—308 |
| 2,151,505 | 3/1939 | Elmendorf | 94—6 |
| 2,164,457 | 7/1939 | Hubbell | 52—747 |
| 2,229,317 | 1/1941 | Van Cleef | 52—411 |
| 2,299,552 | 10/1942 | McGregor et al. | 52—415 |
| 2,472,221 | 6/1949 | Malthouse | 52—611 XR |
| 2,718,829 | 9/1955 | Seymour et al. | 52—390 XR |
| 2,850,890 | 9/1958 | Rubenstein | 52—229 |
| 2,954,646 | 10/1960 | Kopp | 52—663 |

FOREIGN PATENTS

| | | |
|---|---|---|
| 521,400 | 1953 | Belgium. |
| 523,607 | 11/1953 | Belgium. |
| 957,641 | 8/1949 | France. |
| 491,018 | 2/1954 | Italy. |
| 74,917 | 1916 | Switzerland. |

FRANK L. ABBOTT, *Primary Examiner*.

EARL M. BERGERT, JACOB L. NACKENOFF, HENRY C. SUTHERLAND, *Examiners*.

R. J. ROCHE, J. E. MURTAGH, *Assistant Examiners*.